United States Patent [19]
Morey et al.

[11] Patent Number: 5,469,520
[45] Date of Patent: Nov. 21, 1995

[54] COMPRESSION-TUNED FIBER GRATING

[75] Inventors: William W. Morey, West Hartford; Arnold L. Wilson, Bolton, both of Conn.

[73] Assignee: United Technologies Corporation, Hartford, Conn.

[21] Appl. No.: 316,183

[22] Filed: Sep. 30, 1994

[51] Int. Cl.⁶ ................................................ G02B 6/34
[52] U.S. Cl. .................. 385/37; 385/24; 385/31; 359/130; 359/568; 359/569; 359/573
[58] Field of Search .................. 359/15, 3, 34, 359/558, 568, 569, 573, 130; 385/24, 37, 31

[56] References Cited

U.S. PATENT DOCUMENTS

| | | | |
|---|---|---|---|
| 4,725,110 | 2/1988 | Glenn et al. | 385/37 X |
| 4,900,119 | 2/1990 | Hill et al. | 385/27 |
| 5,007,705 | 4/1991 | Morey et al. | 385/37 X |
| 5,042,898 | 8/1991 | Morey et al. | 385/37 |
| 5,042,898 | 8/1991 | Morey et al. | 385/37 |
| 5,367,589 | 11/1994 | MacDonald et al. | 385/37 |
| 5,377,288 | 12/1994 | Kashyap et al. | 385/37 |
| 5,384,884 | 1/1995 | Kashyap et al. | 385/129 |

*Primary Examiner*—Brian Healy
*Attorney, Agent, or Firm*—Gerald L. DePardo

[57] ABSTRACT

A reflective element 26, such as a Bragg grating, impressed in an optical fiber 24, has a reflection wavelength which is tuned by compressing the grating 26. Because an optical fiber is a much stronger under compression than in tension, the grating 26 is tunable over a much broader range than conventional tension/stretching techniques.

9 Claims, 3 Drawing Sheets

COMPRESSION-TUNED FIBER GRATING

CROSS REFERENCE TO RELATED APPLICATIONS

Copending U.S. patent applications Ser. No. 08/316,281, pending entitled "Compression Tuned Fiber Laser," filed contemporaneously herewith, contains subject matter related to that disclosed herein.

TECHNICAL FIELD

This invention relates to fiber Bragg gratings and more particularly to tuned Bragg gratings.

BACKGROUND ART

It is known in the art of optical fibers to impress one or more Bragg gratings in the core of an optical fiber. A Bragg grating as is known reflects a predetermined wavelength-band of light incident thereon and passes the remaining wavelengths. As is also known, Bragg gratings have many uses such as for sensor devices and as components for fiber communications. They provide a wavelength-tunable reflective element which can be used as transducer elements in fiber sensors, as wavelength control devices for fiber, semiconductor, and solid state lasers, as wavelength division multiplexing (WDM) components in communication systems, as wavelength analyzers, as components in signal processing systems, and for other uses. Many of these devices would be greatly enhanced if the fiber grating element had a large wavelength tuning range.

A fiber Bragg grating is wavelength tuned (or changed) by stretching the fiber grating. One technique used is to attach the fiber grating to a piezoelectric stretcher (or tuner) which expands as a function of voltage applied to it or to wrap the grating around a cylindrical mandrel which expands when voltage is applied as described in U.S. Pat. No. 5,007,705 entitled "Variable Optical Fiber Bragg Filter Arrangement," to Morey et al. Numerous other stretching techniques have also been employed, as discussed in the aforementioned patent.

However, the amount that the fiber may be stretched (or tensile strained) and, thus, the maximum wavelength tuning range, is limited by the tensile strength of the fiber. In particular, when a Bragg grating is stretched the Bragg grating reflection wavelength change is about 1.2 nanometer(nm)/millistrain in the 1.55 micron wavelength reflection region. Typical communications-grade optical fibers and waveguides are made of Silica or Silicon Dioxide ($SiO_2$) which has a Young's modulus of $1.02 \times 10^7$ PSI. Therefore, for a typical optical fiber which is proof tested at 50 kpsi, a maximum safe long-term strain of approximately ½% (($\Delta L/L$)*100; where L is the length of fiber stretched) can be applied without degrading the fiber strength which would eventually cause the fiber to break. This limits the maximum amount of tensile strain Bragg grating reflection wavelength tuning to about 5 nanometers.

Alternatively, fiber gratings have been tuned by thermal variation. In that case, the grating is heated which primarily causes the grating to expand and experience a change in refractive index. The change in Bragg reflection wavelength to temperature is approximately 0.011 nm/degree Celsius. The primary adverse effect of thermal tuning is degradation in the amount of reflectivity of the Bragg grating, which is caused by thermal annealing. Such degradation can greatly reduce the usefulness of the gratings. Depending on the particular fiber, fabrication techniques, fiber coating and grating requirements, significant grating degradation can occur at temperatures above about 200 degrees Celsius, thereby limiting practical tuning of the fiber grating to about 2 nanometers.

However, for many applications it is desirable to obtain a fiber Bragg grating which is tunable over as large a wavelength range as possible.

DISCLOSURE OF INVENTION

Objects of the invention include provision of a broadly wavelength-tunable fiber Bragg grating.

According to the present invention a tunable reflective element, comprises a reflective element which reflects indicent light at a reflection wavelength; and compression means for compressing said reflective element so as to change said reflection wavelength.

According further to the present invention, the tunable reflective element comprises a Bragg grating.

The invention represents a significant improvement over prior wavelength tunable fiber grating techniques by the discovery that using compressive stress as opposed to tensile stress (i.e., stretching the grating) allows the fiber grating to be tuned over about a much broader range, e.g., 45 nanometers (nm). This is due in large part because the optical fiber is 23 times stronger under compression than tension, thereby allowing for a much larger wavelength-tunable range from that of the prior art. Also, we have found that the tuning is repeatable in both directions (i.e., compression and relaxation).

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
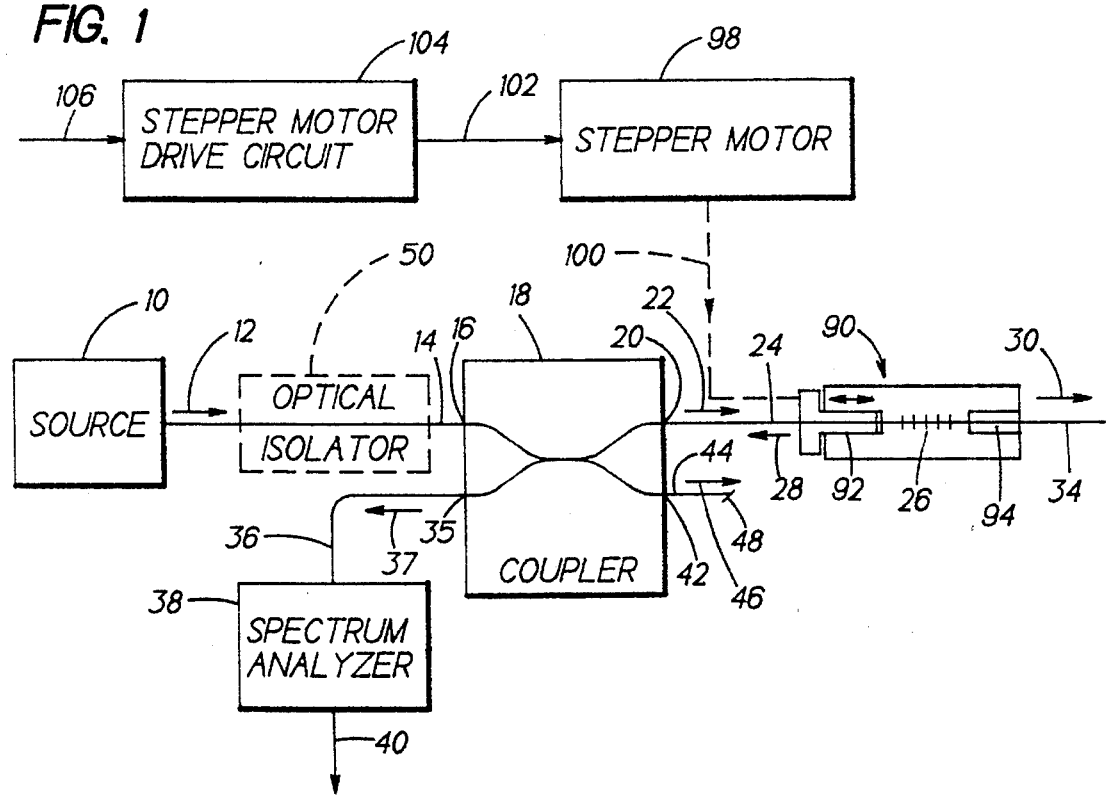
FIG. 1 is a schematic block diagram of an embodiment of a compression tuned fiber grating, in accordance with the present invention.

Referring to FIG. 1, an optical source 10, e.g., a laser diode, provides a broadband light signal 12 on an optical fiber 14. The source signal 12 is fed to a port 16 of a known 2×2 optical coupler 18, which couples a predetermined amount of the input light, e.g. 50%, to a port 20 of the coupler 18 as an optical signal 22 on a fiber 24. The optical fiber 24 is incident on a Bragg grating 26 embedded within the fiber 24 (e.g., a fiber made of $SiO_2$ having a diameter of about 125 microns. The fiber grating is similar to that described in U.S. Pat. No. 4,725,110 entitled "Method for Impressing Gratings Within Fiber Optics" to Glenn et al; however, any wavelength tunable grating may be used if desired. The fiber grating 26 reflects light 28 having a predetermined wavelength band of light centered at a reflection wavelength $\lambda_b$, and passes the remaining wavelengths of the incident light 22 (within a predetermining optical range), as indicated by a line 30, along with a fiber 34. The fibers 24, 34 may be the same fiber with the grating 26 embedded therein.

The reflected signal 28 travels along the fiber 24 and re-enters the coupler 18 at the port 20. The coupler 18 couples a predetermined amount (e.g. 50%) of the light 28 to a port 35 along a fiber 36 as indicated by a line 37. The fiber 36 is connected to a spectrum analyzer 38 which provides electrical signals on lines 40 indicative of the optical wavelength reflection profile of the grating 26 over the wavelength range of the source 10.

The remaining portion, e.g. 50%, of the light 12 is coupled to a port 42 along a fiber 44 as indicated by a line 46. The fiber 44 is terminated at an end 48 by an angled face and/or an anti-reflection coating to prevent any light from reflecting back into the coupler 18 at the port 42. An optical isolator 50 may be provided along the fiber 14 to prevent the signal 28 being coupled to the port 16 from damaging or disrupting the source 10.

The fiber grating 26 is threaded through a fiber compression device 90 (discussed more hereinafter) which accurately compresses the fiber grating along its longitudinal axis and prevents it from buckling. In general, the compression device 90 comprises a moving piston 92 through which the fiber 24 is threaded and a stationary portion 94 through which the fiber 34 is also threaded. Between the pistons 92 and the portion 94, the fiber grating 26 is threaded through ferrules (not shown in FIG. 1). The fiber 24 is affixed (e.g., glued or epoxied) to the moving piston 92 and the stationary portion 94 is also affixed to the fiber 34. A stepper motor 98 is connected by a mechanical linkage 100 to the piston 92 and causes the piston 92 to move and the fiber grating to be compressed longitudinally, thereby tuning the wavelength of the reflected signal 28. The stepper motor 98 may be a high resolution 400 steps/revolution stepper motor which may be driven in a microstepping mode of 10,000 steps/revolution, e.g., a Melles Griot NANOMOVER micropositioner system, which provides a linear translation resolution of +/− 50 nm/step, and a wavelength resolution of +/− 2 picometers, or a frequency of +/− 250 MHz at 1550 nm.

The stepper motor 98 is driven by electrical signals on lines 102 from a stepper motor drive circuit 104. The drive circuit 104 contains known electronics so as to provide drive signals needed to drive the stepper motor 98, and hence the piston 92, to the desired position in response to an electronic drive signal on a line 106 indicative of the desired Bragg wavelength $\lambda_b$.

Figure 2:
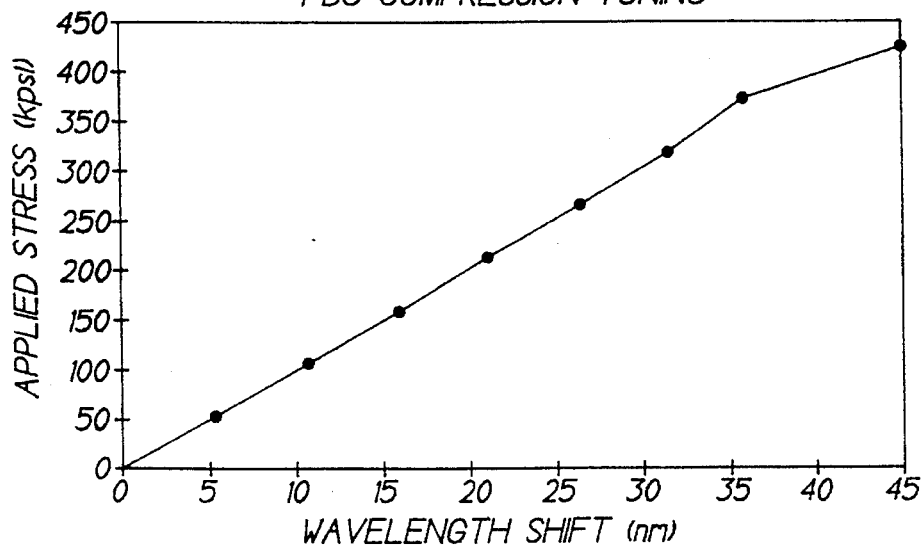
FIG. 2 is a graph of the reflection wavelength against applied compressive stress for a compression tuned fiber grating, in accordance with the present invention.

Referring now to FIG. 2, we have found that because Silica ($SiO_2$), the major component of optical fiber, is about 23 times stronger in compression than in tension, that compressing the fiber grating provides a much broader tuning range. In particular, we have seen a wavelength tuning range of 45 nm, over an applied stress range of 0 to 425 kpsi or 4.2% compression strain (($\Delta L/L$)*100; where L is the length of fiber being compressed), which exerted a force (or load) of about 3.6 kg of force on the fiber. This is a much broader wavelength tuning range than that described by prior art fiber grating tuning techniques. Furthermore, compression does not run the risk of fiber breakage that occurs in the prior art technique of stretching the fiber. Other wavelengths and/or larger compression ranges may be used if desired. Also, even if some non-linear characteristics are exhibited in the output reflection wavelengths at certain higher compression values, such non-linearities may be accounted for and compensated for in the design of the force exerting device, e.g., the stepper motor, so as to provide predictable tunability of the grating over a much broader range of wavelengths than that of the prior art.

Figure 3:
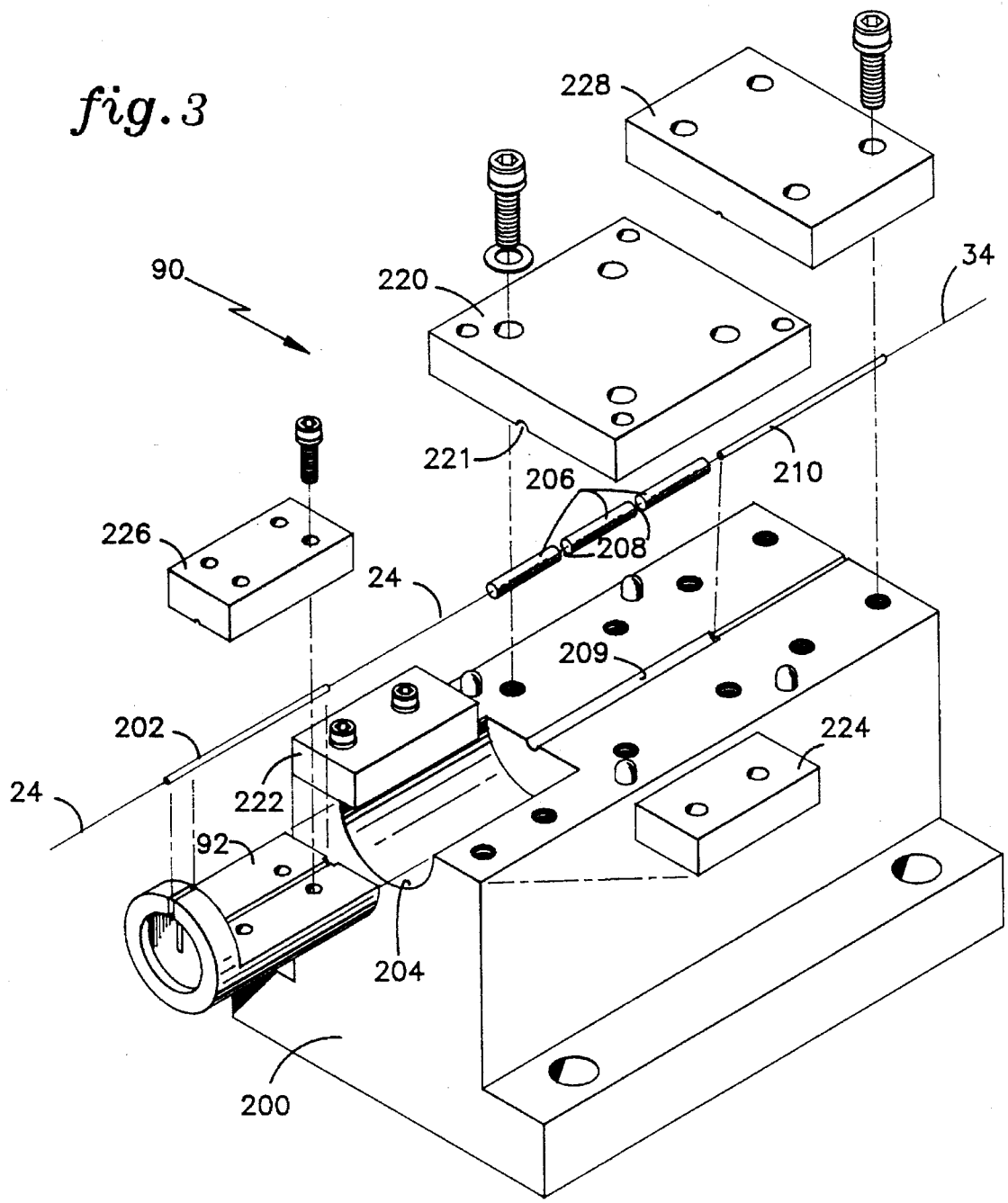
FIG. 3 is a disassembled perspective view of a compression device for compressing a fiber grating, in accordance with the present invention.
Figure 4:
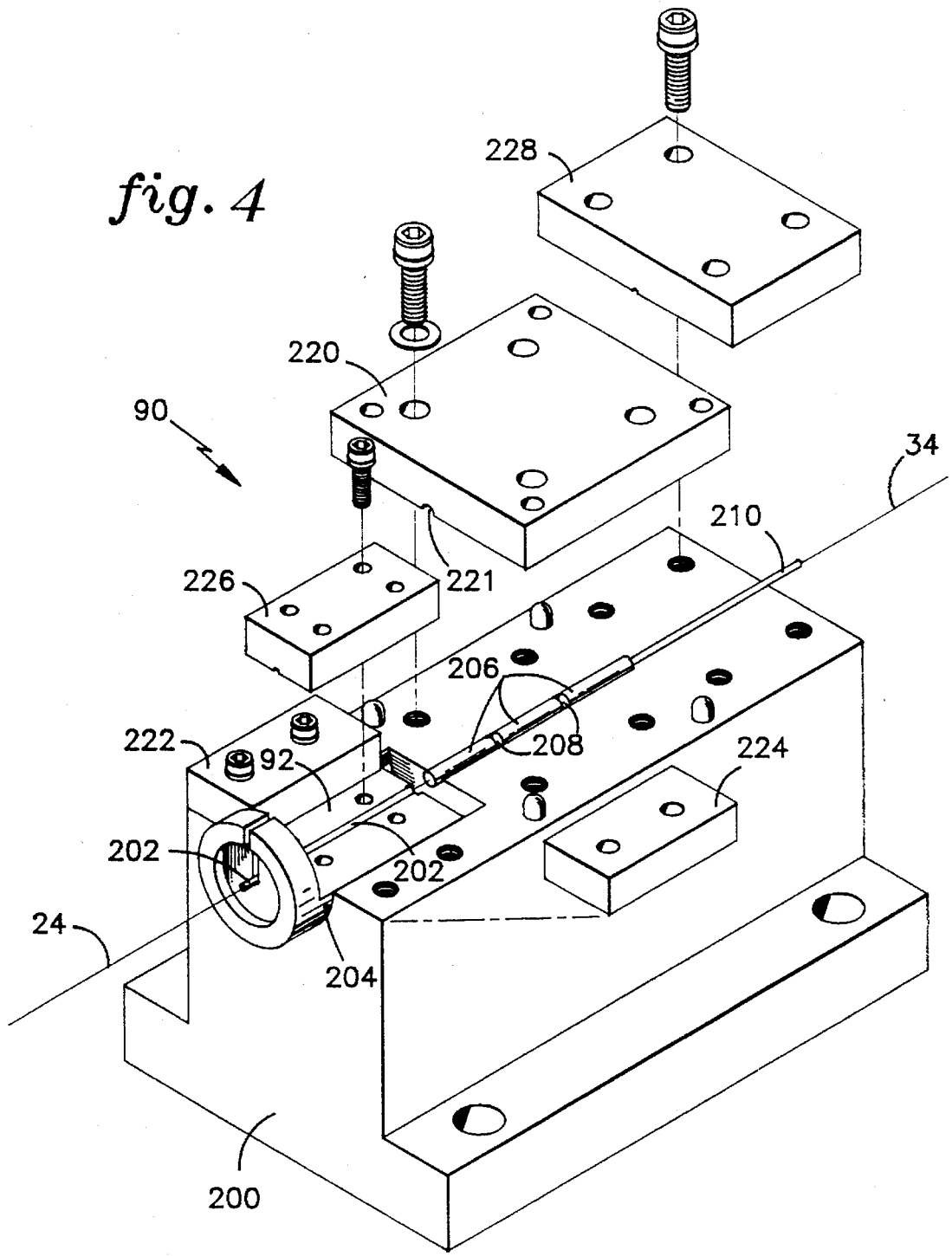
FIG. 4 is a partially disassembled perspective view of a compression device for compressing a fiber grating, in accordance with the present invention.

Referring now to FIGS. 3 and 4, one embodiment of the fiber compression device 90 discussed hereinbefore with FIG. 1 comprises a base 200 which supports the device 90 having a length of about 3.75 inches or 9.53 cm. The fiber 24 is fed through a metal tube (or sleeve) 202 which is secured to the piston 92. The piston 92, having a length of about 3.5 cm, slides along a semi-circular guide 204 in the base 200. The fiber 24 is secured to the tube 202 along the length of the tube 202 to prevent the fiber 24 from sliding during compression of the fiber grating. The fiber 24 exits the guide 202 and the fiber grating 26 (not shown) is threaded through a series of three ferrules 206 having a length of about 1.3 cm, with pre-determined equal spaces (or gaps) 208 therebetween of about 1 mm. This allows for the portions of non-confined fiber to be spread out over the compression range to minimize the possibility of the fiber buckling.

The ferrules are free to slide along a semicircular track 209 in the base 200. The fiber 34 from the output of the fiber grating 26 is fed to another metal tube 210 which is secured to the base 200. Also, the fiber 34 is secured to the tube 210 along the length of the tube 210 to prevent the fiber 34 from sliding during compression of the fiber 34. A cover 220, with a groove 221, is provided over the top of the ferrules 206 to stabilize them and keep them in alignment in a "clam-shell" type arrangement. The total gap over which compression occurs is approximately 3 centimeters. Other compression lengths may be used if desired. Also, other sizes and spacings for the ferrules, and other sizes for the piston 92, base 200 and all other components of the compression device 90 may be used if desired. Also, the spacings 208 may be set to make up most of the total fiber compression if desired. Further, when the compressed fiber is released, springs (not shown) placed in the ferrule gaps 208 may be used to restore the ferrules 206 to their original positions.

The tube 202 is further secured to the piston by a cover 226 and the piston 92 is retained in the guide 204 by overhanging arms 222,224. Also, the tube 210 is further secured to the base 200 by a cover 228. To minimize the possibility of breaking the fiber entrance point of the tube 202 and the exit point of the tube 210, the fiber should not be glued to the end of the tube but such gluing terminated before the end of each tube. This allows the tube to act as a sheath to limit the amount of stress placed on the fiber at the entrance and exit points of the compression device 90.

Instead of using three ferrules 206 as shown in FIGS. 3 and 4, more or less ferrules may be used if desired. Also, instead of allowing the ferrules to slide, one or more of them may be fixed to the base 200 with the fiber sliding therein. Further, the grating 26 may be stripped of any coating, e.g., plastic coating, or the coating may remain on the fiber if desired, provided the coating compresses appropriately.

Still further, instead of using both outputs of the grating 26, the grating may be used in solely reflection mode if desired, (i.e., single ended operation). In that case, the fiber 34 need not exit the compression device 90.

Figure 5:
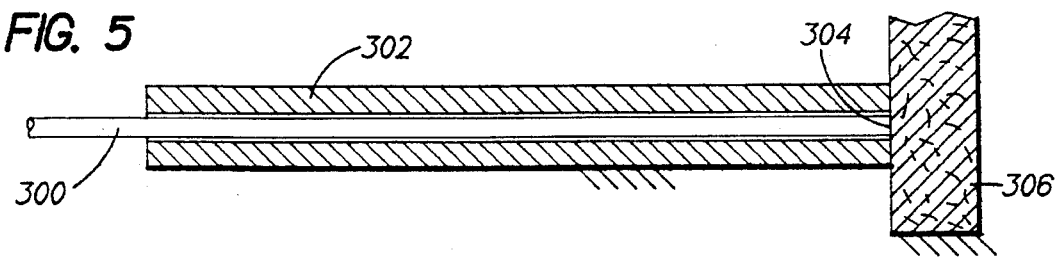
FIG. 5 is a side view of a fixed ferrule having one end blocked and a slidable fiber therein, in accordance with the present invention.

Referring now to FIG. 5, when used as a single-ended fiber grating, instead of fixing both ends of the fiber, the unused end of the fiber 300 may be threaded through a fixed (non-moving) ferrule 302 and the hole at one end of the ferrule 304 blocked by a hard surface (or plate) 306. If the plate 306 is made of Silica, back reflection from the end face of the fiber 300 are minized.

The optical fiber of the fiber grating 26 (FIG. 1) may be made of any glass (e.g., $SiO_2$, phosphate glass, or other glasses) or glass and plastic, or solely plastic. Also, instead of an optical fiber any other optical waveguide may be used, such as a planar waveguide, which is capable of containing light. Also, instead of a Bragg grating, any reflective optical element whose reflection wavelength is tuned by applying a compressive force may be used if desired. Further, as is known, a fiber Bragg grating may be viewed either in reflection or transmission. It should be understood that although the discussion herein has been regarding shift in the reflection wavelength, the invention will work equally well when used in transmission.

Although the invention has described some specific embodiments for the compression device 90 (FIG. 1), any device which compresses fiber longitudinally may be used provided compression is obtained without the fiber buckling. Further, instead of using the stepper motor 98, any device which applies a longitudinal compressive force along the longitudinal axis of the fiber grating to change the reflection wavelength may be used if desired.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A tunable reflective element, comprising:

an optical waveguide which confines and propagates incident light;

a reflective element impressed in said waveguide which reflects said incident light at a reflection wavelength; and compression means for compressing said reflective element so as to change said reflection wavelength, and for tuning said reflective element over a wavelength range greater than a predetermined range, said predetermined range being: 5 nm, 10 nm, 15 nm, 20 nm, or 30 nm.

2. The tunable reflective element of claim 1 wherein said reflective element comprises a Bragg grating.

3. The tunable reflective element of claim 1 wherein said waveguide comprises an optical fiber.

4. The tunable reflective element of claim 1 wherein said waveguide comprises silica.

5. A method for tuning the reflection wavelength of a reflective element, comprising the steps of:

compressing an optical waveguide having a reflective element impressed therein, thereby changing said reflection wavelength of said reflective element and tuning said reflective element over a wavelength range greater than a predetermined range, said predetermined range being: 5 nm, 10 nm, 15 nm, 20 nm, or 30 nm.

6. The method of claim 5 wherein said step of compressing further comprises compressing a Bragg grating.

7. The method of claim 5 wherein said reflective element comprises a Bragg grating impressed.

8. The method of claim 5 wherein said waveguide comprises silica.

9. The method of claim 5 wherein said waveguide comprises an optical fiber.

* * * * *